(12) United States Patent
Gonda et al.

(10) Patent No.: US 9,469,069 B2
(45) Date of Patent: Oct. 18, 2016

(54) AUTOMATIC ATTACHING APPARATUS OF FOAMED SEAL MEMBER

(71) Applicant: TOA Industries Co., Ltd., Ota-shi (JP)

(72) Inventors: Ryuichi Gonda, Isesaki (JP); Koji Hayashi, Tatebayashi (JP)

(73) Assignee: TOA Industries Co., Ltd., Ota-shi (JP)

( * ) Notice: Subject to any disclaimer, the term of this patent is extended or adjusted under 35 U.S.C. 154(b) by 352 days.

(21) Appl. No.: 14/297,305

(22) Filed: Jun. 5, 2014

(65) Prior Publication Data

US 2014/0360675 A1 Dec. 11, 2014

(30) Foreign Application Priority Data

Jun. 6, 2013 (JP) ................. 2013-119355

(51) Int. Cl.
| | |
|---|---|
| B29C 65/00 | (2006.01) |
| B29C 65/78 | (2006.01) |
| F16J 15/02 | (2006.01) |
| B29C 65/50 | (2006.01) |
| B32B 38/00 | (2006.01) |
| B62D 65/06 | (2006.01) |
| B23P 19/04 | (2006.01) |

(52) U.S. Cl.
CPC .......... *B29C 65/7841* (2013.01); *B23P 19/047* (2013.01); *B29C 65/5092* (2013.01); *B29C 66/8362* (2013.01); *B32B 38/1883* (2013.01); *B62D 65/06* (2013.01); *F16J 15/02* (2013.01); *Y10T 156/17* (2015.01)

(58) Field of Classification Search
CPC . B23P 19/047; B62D 65/06; B29C 66/0222; B29C 66/3432; B29C 66/343; B29C 66/8362; B29C 65/5092; B29C 65/7841; B32B 2037/1072; B32B 38/1883; B32B 2038/1891; Y10T 156/17; Y10T 156/1744; F26B 13/104; F26B 13/108
USPC .......................................... 156/574, 576, 497
See application file for complete search history.

(56) References Cited

U.S. PATENT DOCUMENTS 4,406,388 A * 9/1983 Takashi .................. B65H 23/24
226/196.1

FOREIGN PATENT DOCUMENTS

| DE | 3607418 A1 * | 9/1987 | ......... B65H 35/0033 |
|---|---|---|---|
| DE | 102006003940 A1 * | 8/2007 | ............ B23P 19/047 |
| JP | 06002050 A * | 1/1994 | |
| JP | 2012-153286 | 8/2012 | |

* cited by examiner

*Primary Examiner* — John Goff
(74) *Attorney, Agent, or Firm* — Morrison & Foerster LLP

(57) ABSTRACT

An automatic attaching apparatus of a foamed seal member includes an attaching hand handling a foamed seal member, a preset machine in which the foamed seal member is preset, a removing machine removing a release paper, and a robot moving the attaching hand. The attaching hand picks up the foamed seal member from the preset machine, presses the foamed seal member from which the release paper is removed against an attaching surface of a work using a pressing roller in a state where the foamed seal member is floated by an air floating device, and sends out the foamed seal member to attach the foamed seal member to the attaching surface of the work.

6 Claims, 9 Drawing Sheets

AUTOMATIC ATTACHING APPARATUS OF FOAMED SEAL MEMBER

CROSS-REFERENCE OF THE INVENTION

This application claims priority from Japanese Patent Application No. 2013-119355, filed Jun. 6, 2013, the content of which is incorporated herein by reference in its entirety.

BACKGROUND OF THE INVENTION

1. Field of the Invention

The invention relates to an automatic attaching apparatus of a foamed seal member that automatically attaches a foamed seal member to an attaching surface of a work such as the body, the front glass or the like of a motor vehicle.

2. Description of the Related Art

For soundproofing, waterproofing, vibration-proofing, dust-proofing and so on, a straight foamed seal member made of a rubber foamed layer is attached to a steel plate forming the body of a motor vehicle or the front glass thereof by being deformed so as to fit on an attaching surface. An attaching surface of a steel plate forming the body of a motor vehicle or the like is often a complexly curved surface that is curved three-dimensionally.

Conventionally, such attaching of a foamed seal member is performed manually by a worker in the following order. A release paper is attached to the back surface of a foamed seal member through an adhesive layer formed on the back surface. A worker removes this release paper, applies a pattern to an attaching surface of a work, and attaches a foamed seal member to the attaching surface along the pattern.

However, this manual procedure includes many steps and a worker need considerable concentration for repeating the attaching procedure, thereby causing variation in the attached positions of foamed seal members.

The Japanese Patent Application publication No. 2012-153286 discloses an automatic attaching apparatus of a foamed seal member that realizes a decrease in the number of attaching steps and variation in attached positions by automating the attaching working of straight foamed seal members.

In detail, this automatic attaching apparatus of the foamed seal member includes a connection link formed by connecting a plurality of link plates through connection shafts, a hand attached to the lower surface of each of these link plates and grasping a foamed seal member, a chuck removing a release paper partially from the end portion, and a running bar removing all the release paper by running in a horizontal direction in the state where the running bar is inserted in a space between the partially removed release paper and the foamed seal member. Then, the connection link is deformed from a straight shape into a curved shape, and thereby the foamed seal member is deformed along the shape of an attaching surface of a work and then attached to the attaching surface.

With the apparatus described in the Japanese Patent Application publication No. 2012-153286, while a straight foamed seal member is deformed using the connection link, there is a certain limit in the deformation and thus the foamed seal member can not be deformed flexibly. For example, the apparatus has a difficulty in deforming a foamed seal member into a closed loop shape such as a circular shape or a quadrangular shape and attaching it.

SUMMARY OF THE INVENTION

The invention provides an automatic attaching apparatus of a foamed seal member, the apparatus including: a preset machine in which a foamed seal member is preset, the foamed seal member having a release paper attached on its back surface through an adhesive layer; an attaching hand including a clamping device clamping the foamed seal member, an air floating device floating the foamed seal member by air pressure by blowing air to the back surface of the foamed seal member which is released from the clamping, and a pressing roller pressing the foamed seal member against an attaching surface of a work; a removing machine removing the release paper from the foamed seal member clamped by the clamping device; and a moving device moving the attaching hand, wherein the attaching hand attaches the foamed seal member to the attaching surface of the work by pressing the foamed seal member from which the release paper is removed against the attaching surface of the work by the pressing roller and sending out the foamed seal member as the attaching hand moves.

DETAILED DESCRIPTION OF THE INVENTION

Figure 1:
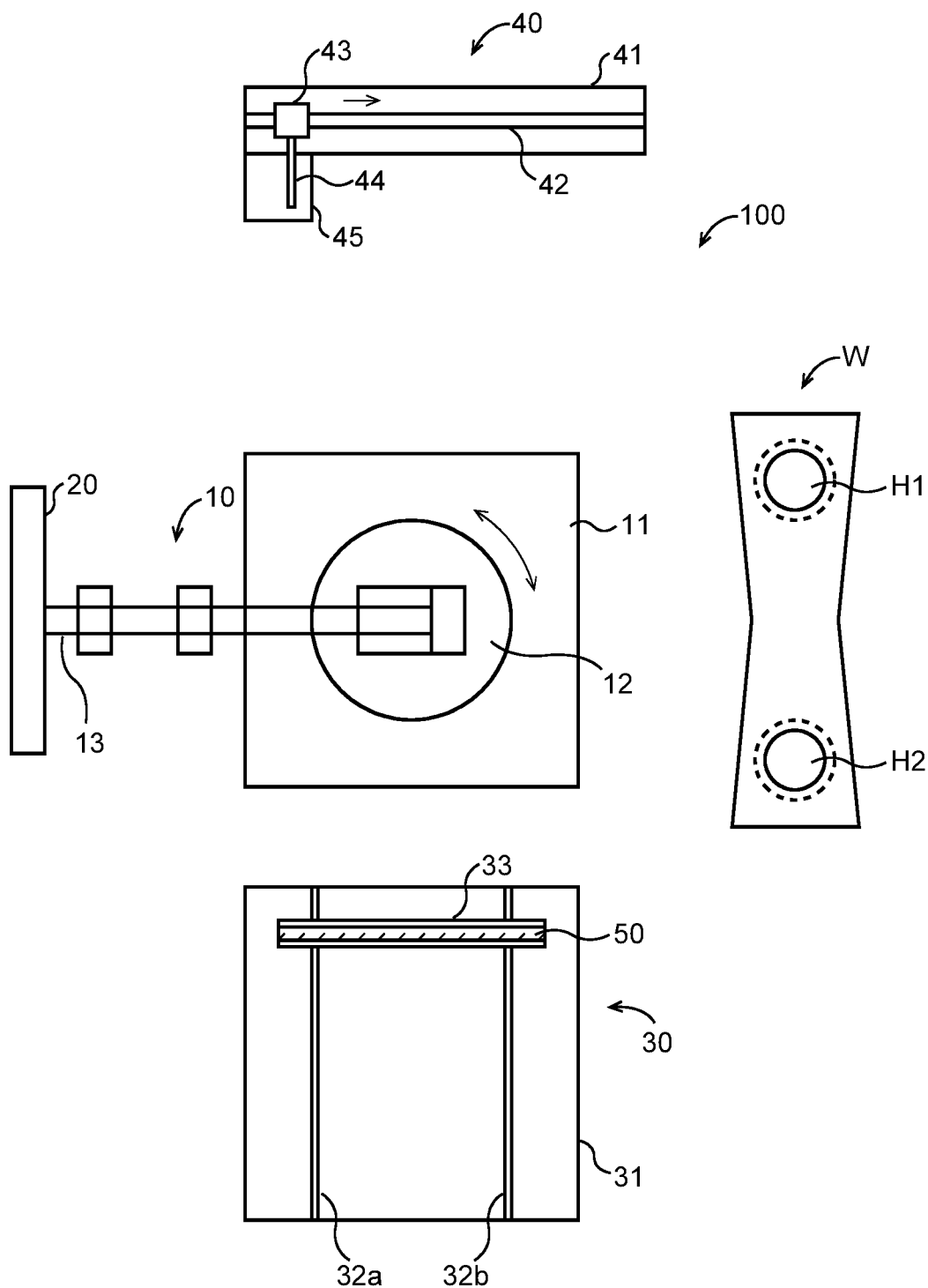
FIG. 1 is a plan view showing the entire structure of an automatic attaching apparatus of a foamed seal member 100 of an embodiment of the invention.

An automatic attaching apparatus of a foamed seal member 100 of an embodiment of the invention will be described referring to FIGS. 1 to 14.

<General Description Of The Automatic Attaching Apparatus Of The Foamed Seal Member 100>

The automatic attaching apparatus of the foamed seal member 100 of an embodiment of the invention removes a release paper 51 from a foamed seal member 50 on which the release paper 51 is attached to cover all the back surface through an adhesive layer and then attaches the foamed seal member 50 to an attaching surface of a work W. The foamed seal member 50 has a straight shape (an oblong cuboid shape).

The automatic attaching apparatus of the foamed seal member 100 includes an attaching hand 20 handling a foamed seal member 50, a preset machine 30 in which a foamed seal member 50 is preset, a removing machine 40 removing a release paper 51, and a robot 10 (an example of a moving device) moving the attaching hand 20 attached thereto flexibly.

The attaching hand 20 picks up a foamed seal member 50 from the preset machine 30, presses the foamed seal member 50 against an attaching surface of a work W using a pressing roller 27 in the state where the foamed seal member 50 from which the release paper 51 is removed by the removing machine 40 is floated by an air floating device 24, and sends out the foamed seal member 50 as the attaching hand 20 moves, thereby attaching the foamed seal member 50 to the attaching surface of the work W.

By this, the foamed seal member 50 is deformed into a desired shape including a circular shape, a quadrangular shape or the like and attached to the attaching surface of the work W.

<Detailed Description Of The Automatic Attaching Apparatus Of The Foamed Seal Member 100>

Hereafter, the structure of the automatic attaching apparatus of the foamed seal member 100 will be described in detail. As shown in FIG. 1, the preset machine 30, the removing machine 40 and a work W are disposed around the robot 10. The work W is, for example, a body component of a motor vehicle which is made of a steel member, and circular hole portions H1, H2 are formed near both the ends of the work W. The foamed seal member 50 is to be attached to the surface of the steel member around these hole portions H1, H2 by being deformed into a circular shape.

The preset machine 30 has a carrier 33 that linearly reciprocates on parallel rails 32*a*, 32*b* provided on a base 31. Although not shown, a driving device (such as a motor or a gear) that drives the carrier 33 is provided on the base 31.

Figure 3:
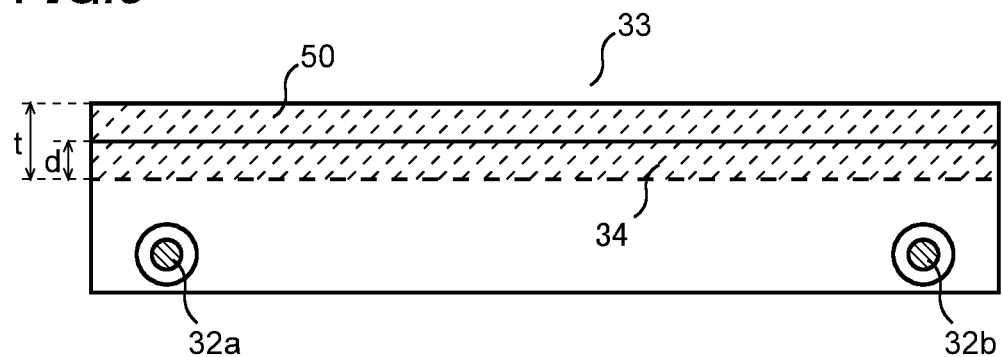
FIG. 3 is a front view of a preset machine.
Figure 4:
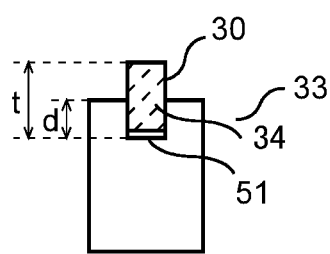
FIG. 4 is a side view of the preset machine.
Figure 5:
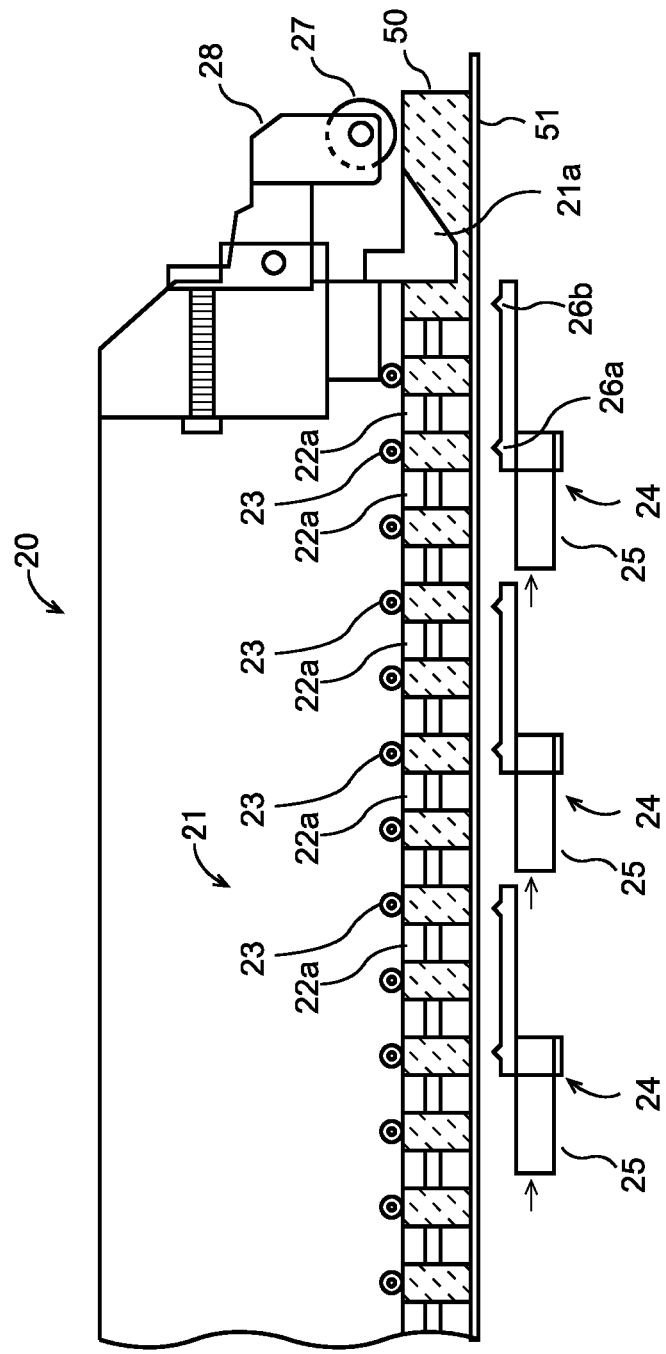
FIG. 5 is a front view of an attaching hand.

As shown in FIGS. 1, 3 and 4, the carrier 33 has a groove portion 34 between a pair of support walls that extend straight in the direction perpendicular to the rails 32*a*, 32*b*. The foamed seal member 50 extending straight is fit in the groove portion 34 along the longitudinal direction so that the release paper 51 is positioned on the bottom side of the groove portion 34. The depth (d) of the groove portion 34 is smaller than the thickness (t) of the foamed seal member 50 including the release paper 51, and the foamed seal member 50 that is fit in the groove portion 34 protrudes from the upper end surface of the carrier 33. This preset working is performed by a worker.

When the foamed seal member 50 is preset in the carrier 33 of the preset machine 30, the carrier 33 runs from one rail ends of the rails 32*a*, 32*b* toward the rail ends on the robot 10 side, stops at the rail ends on the robot 10 side, and waits until the attaching hand 20 comes for picking up the foamed seal member 50.

Figure 2:
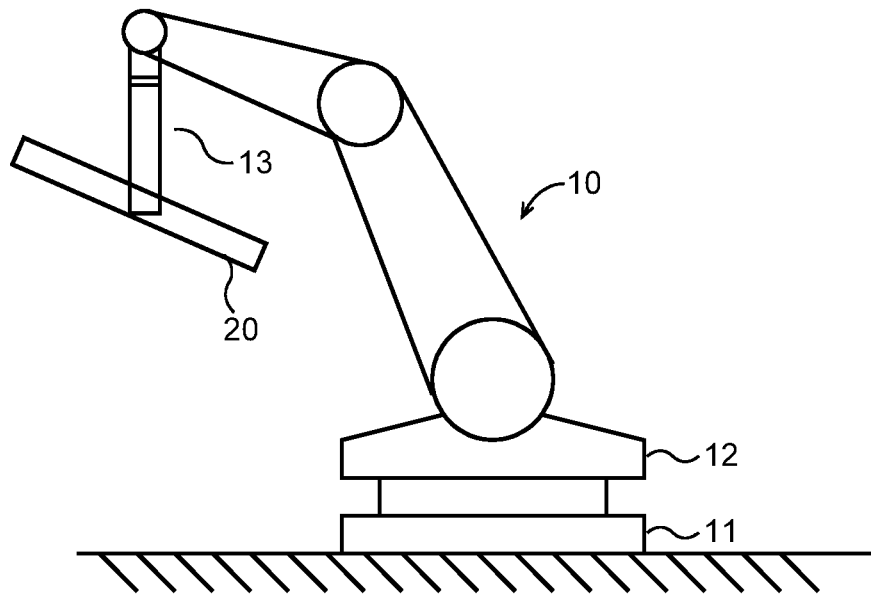
FIG. 2 is a view of the structure of a robot.

The robot 10 is formed of a general purpose working robot having a CPU performing a computer program. As shown in FIGS. 1 and 2, the robot 10 includes a rotation board 12 provided on a base 11, which is rotatable within the horizontal plane, and an arm 13 attached to the rotation board 12, which is movable in an arbitrary three-dimensional direction. The rotation board 12 and the arm 13 are formed so as to be controllable according to a computer program. The attaching hand 20 is attached to an end portion of this arm 13.

As shown in FIG. 5 and FIGS. 7 to 13, the attaching hand 20 includes a clamping device 21 picking up the foamed seal member 50 from the preset machine 30 and clamping it from both sides, an air floating device 24 floating the foamed seal member 50 by air pressure by blowing air to the back surface of the foamed seal member 50 in the state where the foamed seal member 50 is released from being clamped, a pressing roller 27 pressing the foamed seal member 50 against the attaching surface of the work W, and a plurality of upper surface guide rollers 23 guiding the upper surface of the foamed seal member 50. The plurality of upper surface guide rollers 23 are disposed along the longitudinal direction of the foamed seal member 50 so as to contact the upper surface of the foamed seal member 50.

The clamping device 21 includes end clamping portions 21*a*, 21*b* opposed to each other on either side of the foamed seal member 50, and a plurality of side surface clamping rollers 22*a*, 22*b*. In detail, the end clamping portion 21*a* is disposed on the left side of the pressing roller 27, and the end clamping portion 21*b* is disposed on the right side of the pressing roller 27. The plurality of side surface clamping rollers 22*a* are disposed on the left side of the pressing roller 27 along the longitudinal direction of the foamed seal member 50, and the plurality of side surface clamping rollers 22*b* are disposed on the right side of the pressing roller 27 along the longitudinal direction of the foamed seal member 50.

The end clamping portions 21*a*, 21*b* clamp the end portion of the foamed seal member 50 from both sides. The plurality of side surface clamping rollers 22*a*, 22*b* clamp the rear portion of the foamed seal member 50 from both sides. The end clamping portions 21*a*, 21*b* and the side surface clamping rollers 22*a*, 22*b* are connected to each other, and formed so as to move together in a horizontal direction.

Figure 7:
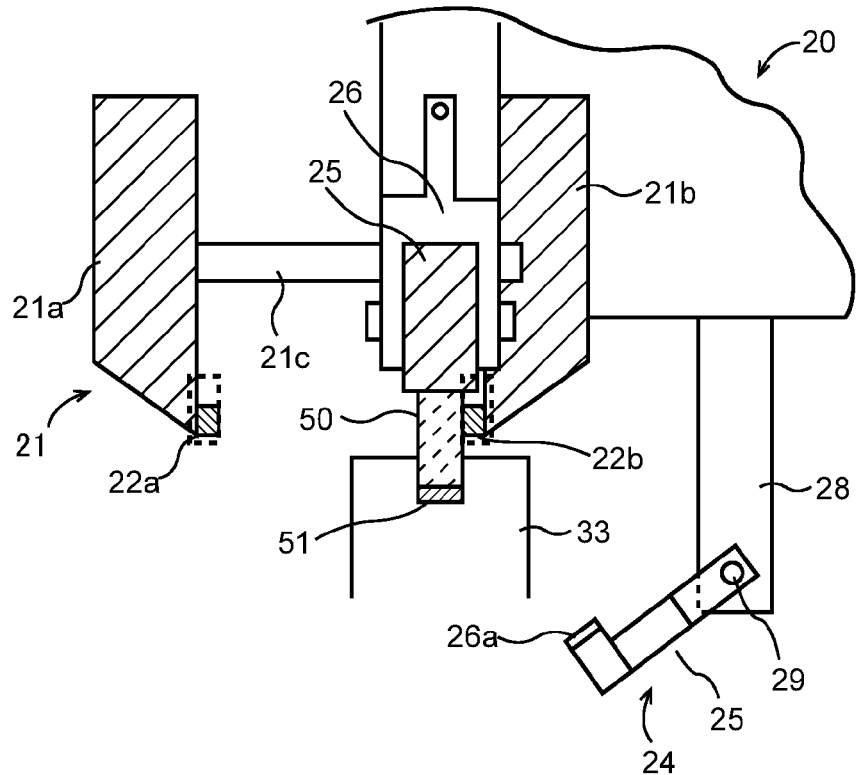
FIG. 7 is a side view of the attaching hand for explaining the operation (approaching the preset machine).
Figure 8:
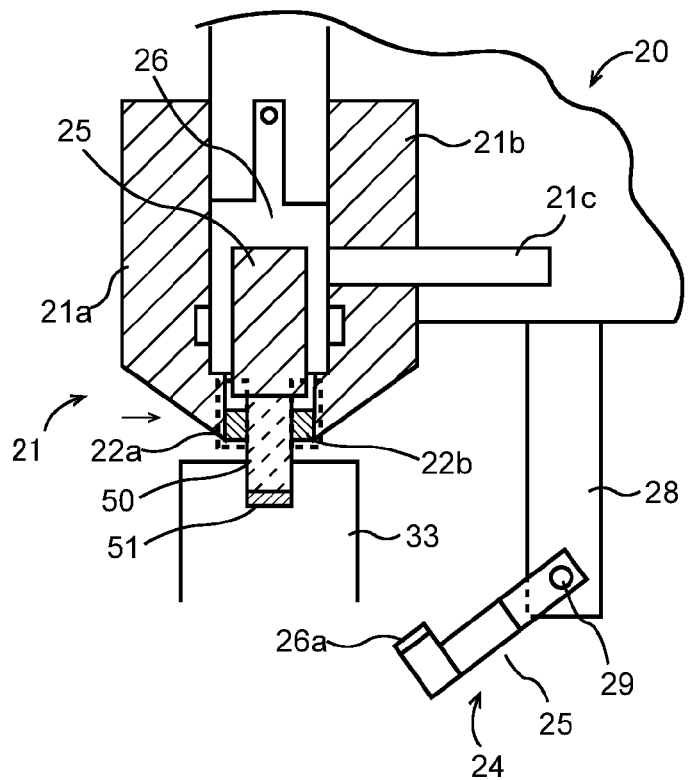
FIG. 8 is a side view of the attaching hand for explaining the operation (clamping a foamed seal member).

In detail, the end clamping portions 21*a*, 21*b* and the side surface clamping rollers 22*a*, 22*b* move forward toward the foamed seal member 50, come into contact with both sides of the foamed seal member 50, and press the foamed seal member 50 inside, thereby clamping the foamed seal member 50 by the pressing force. When the side surface clamping rollers 22*a*, 22*b* and the end clamping portions 21*a*, 21*b* move backward toward the outside from both sides, the clamping is released. In this case, the drive mechanism of the end clamping portion 21*a* and the side surface clamping rollers 22*a* is formed by moving a moving shaft 21*c* in a horizontal direction, the moving shaft 21*c* being connected to these members and extended in a horizontal direction (ref. FIGS. 7 and 8).

The air floating device 24 includes a rotation bar 25 of which one end 29 is rotatably supported, and air blow nozzles 26*a*, 26*b* attached on the other end side of the rotation bar 25. The one end 29 of the rotation bar 25 is rotatably attached to the lower end of a roller support portion 28 attached to the lower portion of the body of the attaching hand 20. The rotation bar 25 is formed stretchable and retractable so as to prevent contacting the preset machine 30 and float the foamed seal member 50 by blowing air to the back surface thereof. In this case, the rotation bar 25 is stretched and retracted by, for example, layering two bars partially and sliding one of the bars. The plurality of air floating devices 24 are disposed along the longitudinal direction of the foamed seal member 50.

The pressing roller 27 is supported by the roller support portion 28 attached to the end portion of the attaching hand 20, and given pressing force by the movement of the attaching hand 20 so as to press the foamed seal member 50 against the attaching surface of the work W.

The removing machine 40 includes a holding portion 45 for the release paper 51 of the foamed seal member 50, and a running bar 44, as shown in FIG. 1 and FIG. 6A to 6D. In this case, the release paper 51 is attached to the foamed seal member 50 so that its end portion protrudes from the end of the foamed seal member 50. The holding portion 45 includes a holding mount 46 and a holding board 48 connected to a cylinder 47 and moving upward and downward. The running bar 44 is attached to a running mount 43 moving horizontally on a rail 42 extended on a base 41.

Figure 6A:
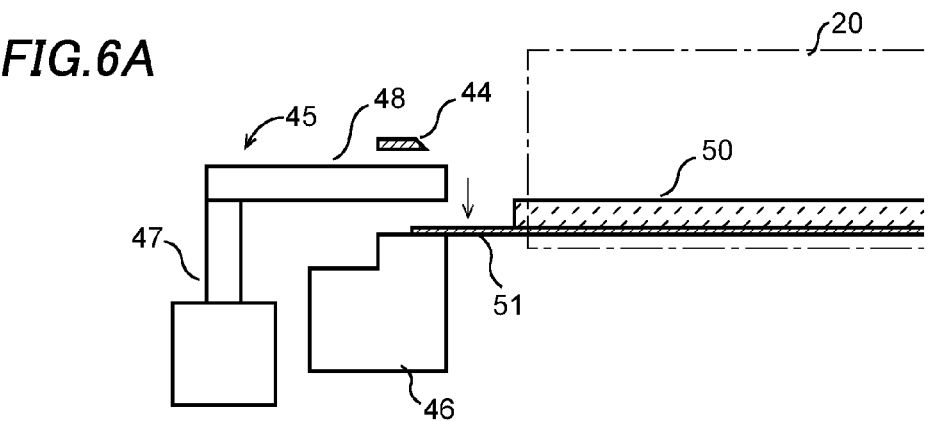
FIGS. 6A to 6D are views of a removing machine for explaining the operation.

The removing operation of the removing machine 40 will be described. First, as shown in FIG. 6A, the attaching hand 20 picks up the foamed seal member 50 from the preset machine 30, approaches the removing machine 40 while clamping the foamed seal member 50 from both sides, and inserts the end of the release paper 51 protruding from the end of the foamed seal member 50 between the holding mount 46 and the holding board 48.

Figure 6B:
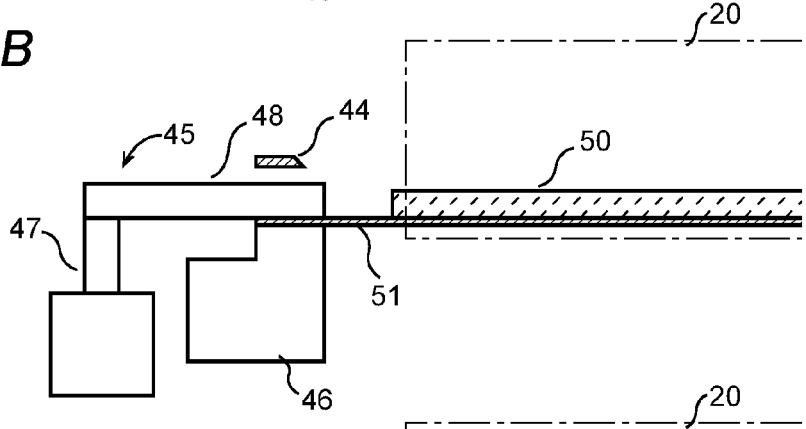
Figure 6C:
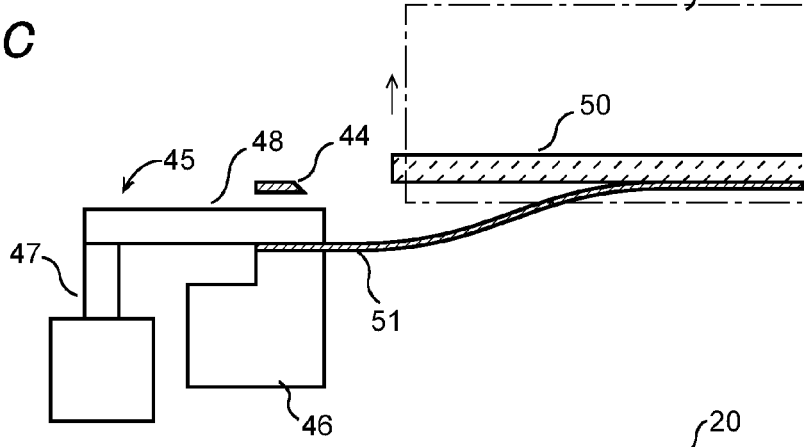

Then, as shown in FIG. 6B, the holding board 48 moves downward, and the end of the release paper 51 is held between the holding mount 46 and the holding board 48. As shown in FIG. 6C, the attaching hand 20 is then moved upward to a higher position than the running bar 44. Then the release paper 51 is partially removed from the end of the foamed seal member 50 to a certain position thereof in the longitudinal direction, and a space is formed between the release paper 51 and the back surface of the foamed seal member 50.

Figure 6D:
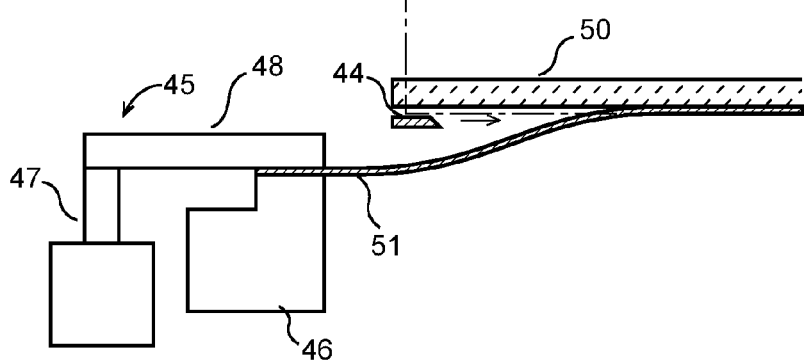

Then, as shown in FIG. 6D, the running bar 44 is inserted in this space and runs in the horizontal direction. By this, all the release paper 51 is removed from the foamed seal member 50. Then the holding board 48 is moved upward to release the holding of the release paper 51, and the release paper 51 falls by its weight and is collected in a collection box disposed thereunder (not shown).

<The Description Of The Operation Of The Automatic Attaching Apparatus Of The Foamed Seal Member 100>

Next, the operation of the automatic attaching apparatus of the foamed seal member 100 formed as described above will be described referring to FIGS. 7 to 14. In the operation described below, the movement of the attaching hand 20 is performed by the robot 10. FIGS. 7 to 13 are the right side views of the attaching hand 20.

First, when a foamed seal member 50 is preset in the carrier 33 of the preset machine 30 by a worker, the carrier 33 runs from one rail ends of the rails 32a, 32b toward the rail ends on the robot 10 side, stops at the rail ends on the robot 10 side, and waits until the attaching hand 20 comes for picking up the foamed seal member 50.

Then, as shown in FIG. 7, the attaching hand 20 approaches the preset machine 30 in which the foamed seal member 50 is preset. At this time, the end clamping portion 21b and the side surface clamping rollers 22b shown on the right side in FIG. 7 contact the right side surface of the foamed seal member 50 protruding from the carrier 33 of the preset machine 30. The end clamping portion 21a and the side surface clamping rollers 22a on the left side are positioned backward on the left side (a large open state). At this time, the pressing roller 27 and the upper surface guide rollers 23 contact the upper surface of the foamed seal member 50. The air floating device 24 waits at a position where it does not contact the preset machine 30 with the rotation bar 25 retracted in the longitudinal direction.

Then, as shown in FIG. 8, the end clamping portion 21a and the side surface clamping rollers 22a on the left side move forward toward the foamed seal member 50, and contact the left side surface of the foamed seal member 50. By this, the foamed seal member 50 is clamped from both sides.

Figure 9:
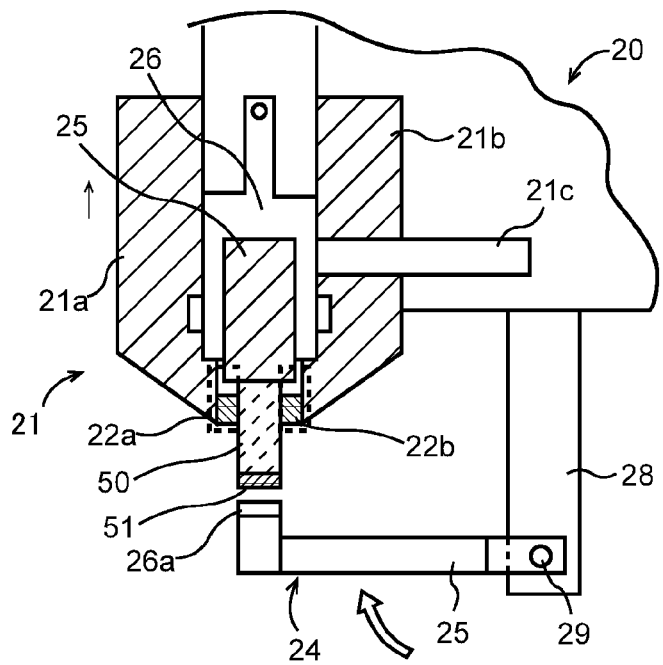
FIG. 9 is a side view of the attaching hand for explaining the operation (preparing for floating the foamed seal member).

Then, as shown in FIG. 9, the attaching hand 20 moves upward in the vertical direction while clamping the foamed seal member 50, thereby picking up the foamed seal member 50 from the preset machine 30. The attaching hand 20 then prepares for floating the foamed seal member 50 by the air floating device 24. In detail, the rotation bar 25 of the air floating device 24 rotates clockwise (as shown in the bold arrow) and stretches in its longitudinal direction so as to place the air blow nozzles 26a, 26b immediately under the foamed seal member 50. At this time, the attaching hand 20 is positioned above the preset machine 30, and thus the air floating device 24 does not contact the preset machine 30. Among the air blow nozzles 26a, 26b, only the air blow nozzle 26a is shown in FIGS. 7 to 13.

Figure 10:
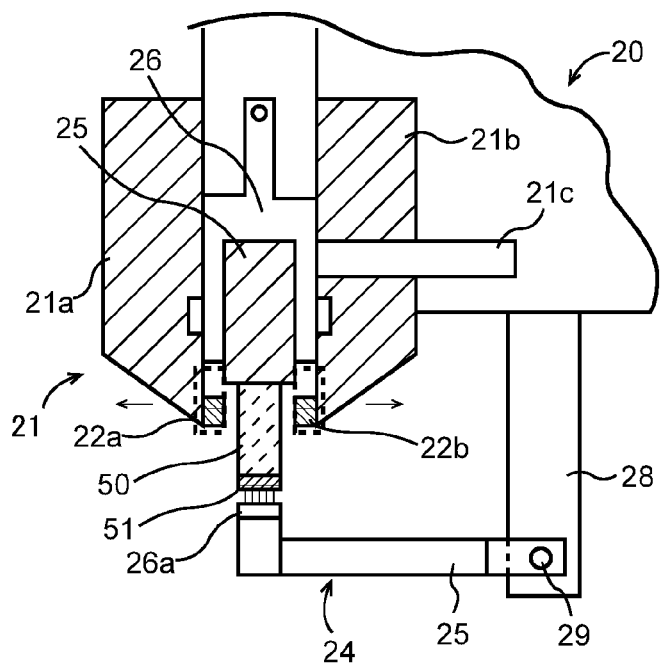
FIG. 10 is a side view of the attaching hand for explaining the operation (floating the foamed seal member).

Then, as shown in FIG. 10, air is blown from the air blow nozzles 26a, 26b to the back surface of the foamed seal member 50 attached with the release paper 51. Then the end clamping portions 21a, 21b and the side surface clamping rollers 22a, 22b respectively move backward slightly, thereby releasing the clamping. The air blow by the air blow nozzles 26a, 26b is continued for a predetermined time even after the release of the clamping. By this, the foamed seal member 50 is floated by air pressure in a space surrounded by the air blow nozzles 26a, 26b, the end clamping portions 21a, 21b, the side surface clamping rollers 22a, 22b, the pressing roller 27, and the upper surface guide rollers 23.

By the floating of this foamed seal member 50, stress applied to the foamed seal member 50 when it is preset in the preset machine 30 is released. In detail, since the foamed seal member 50 has flexibility, when it is preset in the preset machine 30 by hand by a worker, stress is applied thereto and flexure (deformation) occurs. This stress and flexure still remain when the foamed seal member 50 is clamped by the attaching hand 20. Therefore, the clamping position of the foamed seal member 50 is not stable, and unexpected flexure or curve may occur in the foamed seal member 50 when the foamed seal member 50 is attached to a work W. Therefore, stress is released by floating the foamed seal member 50 after the clamping so as to retrieve the original flexure-free straight state of the foamed seal member 50.

Figure 11:
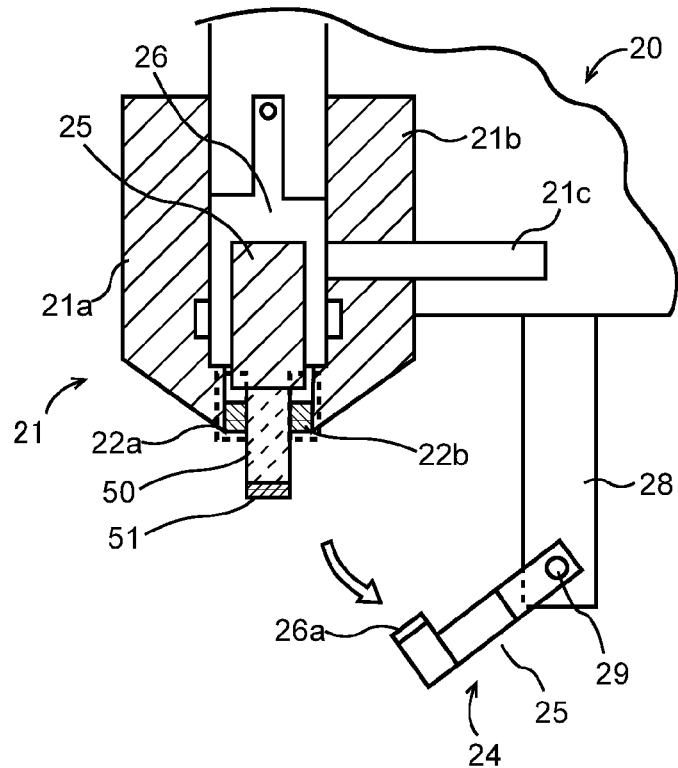
FIG. 11 is a side view of the attaching hand for explaining the operation (re-clamping the foamed seal member and preparing for removing a release paper).

Then, as shown in FIG. 11, the end clamping portions 21a, 21b and the side surface clamping rollers 22a, 22b respectively move forward to the foamed seal member 50, and the foamed seal member 50 is clamped again. In this re-clamping, the foamed seal member 50 is clamped while extended straight, and the clamping position is stable. The air blow of the air blow nozzles 26a, 26b stop after the re-clamping, and the rotation bar 25 rotates counter-clockwise (as shown in the bold arrow) in the reverse direction and retracts in the longitudinal direction to return to the original position. The attaching hand 20 then moves to the removing machine 40 and the release paper 51 is removed as described above.

Figure 12:
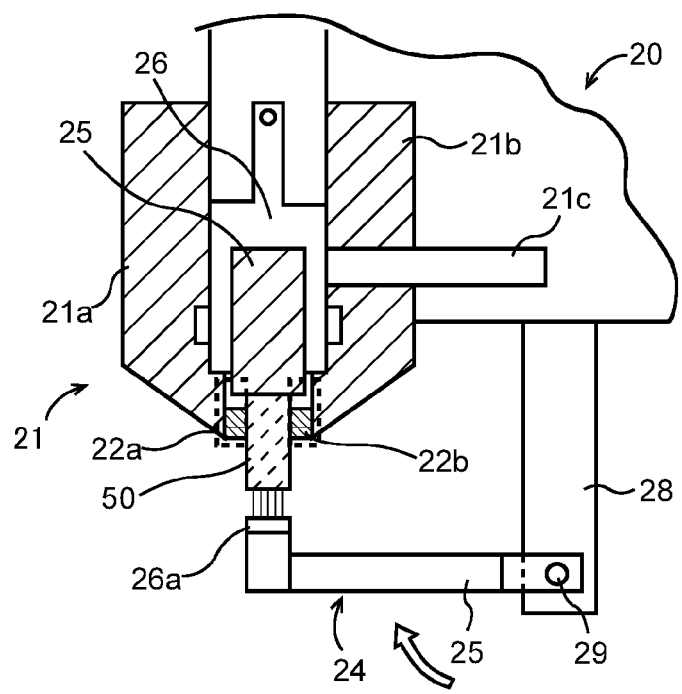
FIG. 12 is a side view of the attaching hand for explaining the operation (preparing for floating the foamed seal member from which the release paper is removed).

Then, as shown in FIG. 12, the attaching hand 20 prepares for floating the foamed seal member 50 again. In detail, the rotation bar 25 of the air floating device 24 rotates clockwise (as shown in the bold arrow) and stretches in its longitudinal direction so as to place the air blow nozzles 26a, 26b immediately under the foamed seal member 50. Air is then blown to the back surface of the foamed seal member 50 from which the release paper 51 is removed by the air blow nozzles 26a, 26b.

Figure 13:
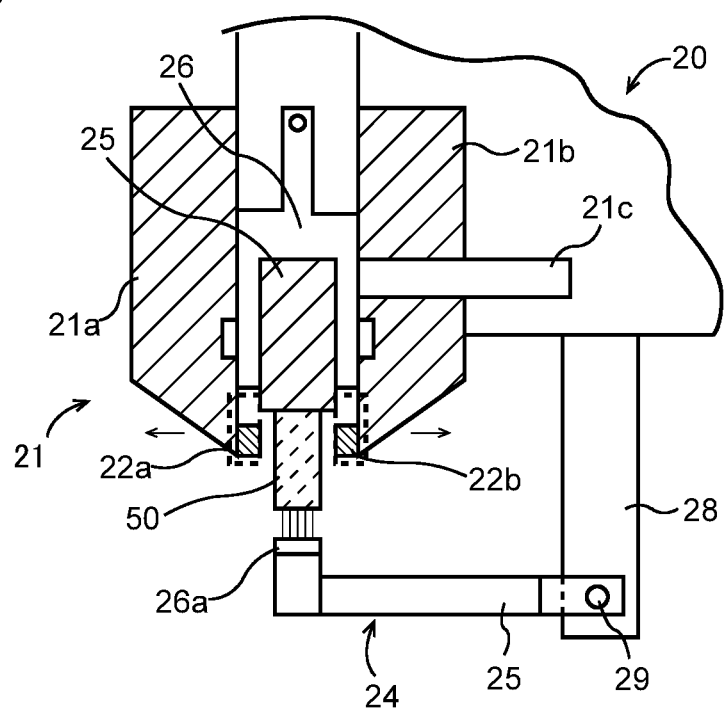
FIG. 13 is a side view of the attaching hand for explaining the operation (floating the foamed seal member).

Then, as shown in FIG. 13, the end clamping portions 21a, 21b and the side surface clamping rollers 22a, 22b respectively move backward slightly, thereby releasing the clamping. The air blow is continued even after the release of the clamping. By this, the foamed seal member 50 is floated again. In detail, the foamed seal member 50 is floated by air pressure in a space surrounded by the air blow nozzles 26a, 26b, the end clamping portions 21a, 21b, the side surface clamping rollers 22a, 22b, the pressing roller 27, and the upper surface guide rollers 23.

Figure 14:
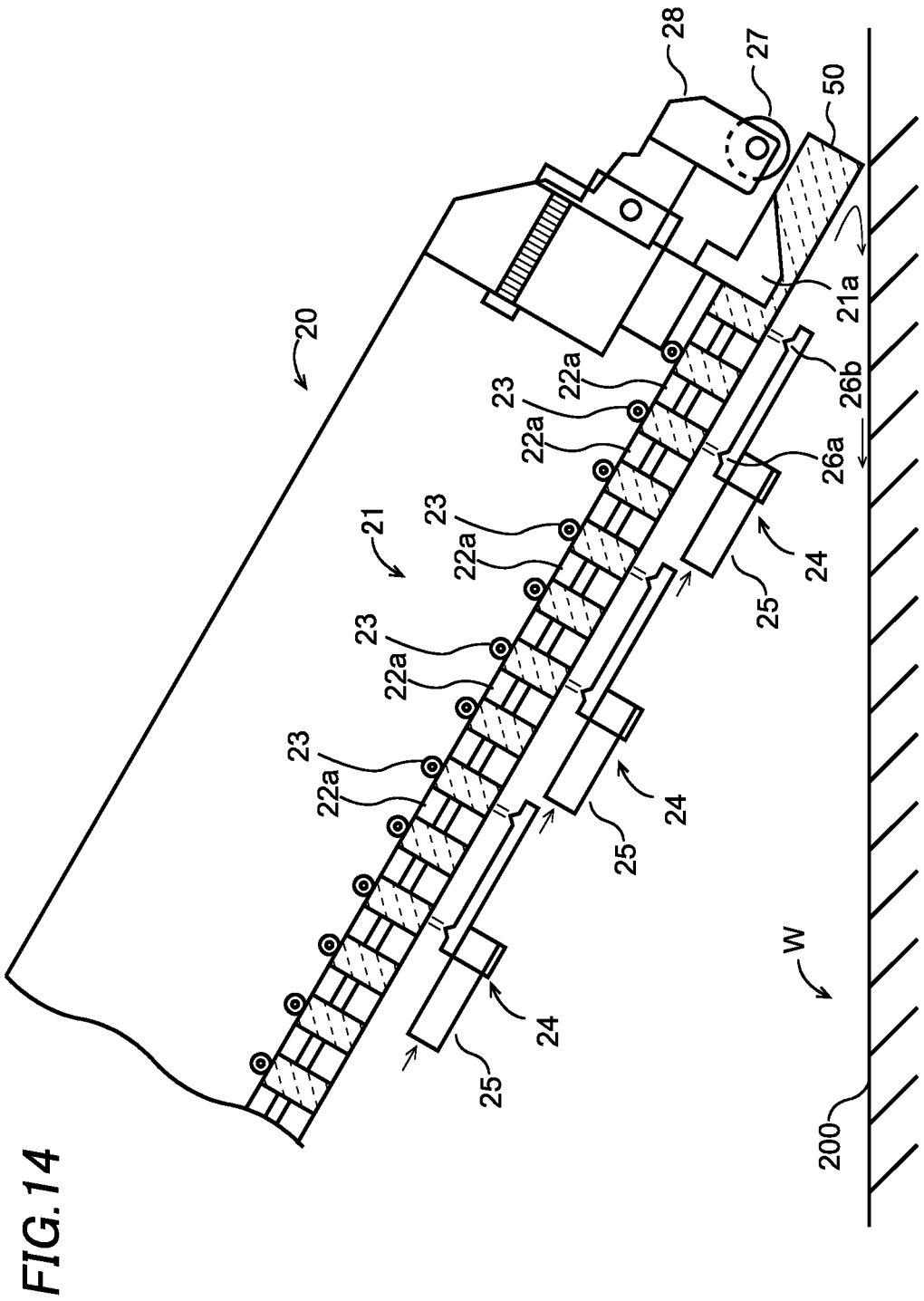
FIG. 14 is a view for explaining the operation of attaching the foamed seal member by the attaching hand.

Then, as shown in FIG. 14, the attaching hand 20 approaches an attaching surface 200 of a work W. At this time, the attaching hand 20 approaches the attaching surface 200 from a slanting direction, heading the end of the attaching hand 20 toward the attaching surface 200 of the work W.

The attaching hand 20 then presses the floated foamed seal member 50 from which the release paper 51 is removed against the attaching surface of the work W by the pressing roller 27, and sends out the foamed seal member 50 to attach the foamed seal member 50 to the attaching surface of the work W. In this case, since the foamed seal member 50 is attached to the attaching surface through the adhesive layer exposed on its back surface and is held floating in the attaching hand 20, the foamed seal member 50 is naturally sent out from the attaching hand 20 by moving the attaching hand 20 along the attaching route.

At this time, by moving the attaching hand 20 so as to draw a circle by the end of the attaching hand 20, the foamed seal member 50 is deformed into a circular shape and attached to the steel surface around the hole portion H1 (or another hole portion H2) of the work W, forming a circular loop shape. Furthermore, by moving the attaching hand 20 so as to draw a quadrangular shape by the end of the attaching hand 20, the foamed seal member 50 is deformed into a triangle shape, a quadrangular shape or other desired shape and attached thereto. Even in a case where the attaching surface 200 of the work W is a curved surface instead of a planar surface, the foamed seal member 50 is attached to the curved surface by moving the attaching hand 20 along the curved surface.

When one attaching operation is completed, the attaching hand 20 returns to the preset machine 30 again, picks up the next foamed seal member 50, and performs the removing operation of the release paper 51 and the attaching operation respectively.

As described above, the automatic attaching apparatus of the foamed seal member 100 of the embodiment removes a release paper 51 from a straight foamed seal member 50, and deforms the foamed seal member 50 into a desired shape including a circular shape, a quadrangular shape or the like to attach the foamed seal member 50 to an attaching surface 200 of a work W.

What is claimed is:

1. An automatic attaching apparatus of a foamed seal member, the apparatus comprising:
   a preset machine in which a foamed seal member is preset, the foamed seal member having a release paper attached on its back surface through an adhesive layer;
   an attaching hand comprising a clamping device configured for clamping the foamed seal member, an air floating device configured for floating the foamed seal member with air pressure by blowing air to the back surface of the foamed seal member which is released from the clamping, and a pressing roller configured for pressing the foamed seal member against an attaching surface of a work;
   a removing machine configured for removing the release paper from the foamed seal member clamped by the clamping device; and
   a moving device configured for moving the attaching hand,
   wherein the apparatus is configured so that the attaching hand attaches the foamed seal member to the attaching surface of the work by pressing, using the pressing roller, the foamed seal member from which the release paper is removed against the attaching surface of the work as the attaching hand moves.

2. The automatic attaching apparatus of the foamed seal member of claim 1, wherein, the attaching hand is configured to clamp the foamed seal member by the clamping device prior to removing the release paper, then float the foamed seal member by the air floating device while releasing the clamping, and then clamp the foamed seal member by the clamping device again.

3. The automatic attaching apparatus of the foamed seal member of claim 1, wherein the clamping device comprises a pair of side surface clamping rollers opposed to each other on both sides of the foamed seal member, which clamp the foamed seal member and release the clamping by moving in a horizontal direction.

4. The automatic attaching apparatus of the foamed seal member of claim 1, wherein the air floating device comprises a extendable and retractable rotation bar, one end of which is supported rotatably and the other end of which an air blow nozzle is attached to.

5. The automatic attaching apparatus of the foamed seal member of claim 1, wherein the attaching hand comprises an upper surface guide roller configured for guiding an upper surface of the foamed seal member.

6. The automatic attaching apparatus of the foamed seal member of claim 1, wherein an end portion of the release paper protrudes from an end of the foamed seal member, and the removing machine comprises a holding portion configured for clamping and holding the end portion of the release paper from upper and lower directions and a running bar configured for removing all the release paper by running in a horizontal direction in a state where the running bar is inserted in a space formed between the release paper held by the holding portion and the foamed seal member.

* * * * *